US011936726B2

(12) United States Patent
Chandrasekaran et al.

(10) Patent No.: US 11,936,726 B2
(45) Date of Patent: Mar. 19, 2024

(54) METHODS AND SYSTEMS FOR IMPLEMENTING TRAFFIC MIRRORING FOR NETWORK TELEMETRY

(71) Applicant: Pensando Systems Inc., Milpitas, CA (US)

(72) Inventors: Varagur Chandrasekaran, Fremont, CA (US); Sameer Kittur Subrahmanya, Fremont, CA (US); Balakrishnan Raman, Fremont, CA (US); Tuyen Quoc, Saratoga, CA (US); Murty Subba Rama Chandra Kotha, San Jose, CA (US)

(73) Assignee: Pensando Systems Inc., Milpitas, CA (US)

( * ) Notice: Subject to any disclaimer, the term of this patent is extended or adjusted under 35 U.S.C. 154(b) by 169 days.

(21) Appl. No.: 17/450,664

(22) Filed: Oct. 12, 2021

(65) Prior Publication Data
US 2023/0111744 A1 Apr. 13, 2023

(51) Int. Cl.
*H04L 29/08* (2006.01)
*H04L 12/46* (2006.01)
*H04L 43/02* (2022.01)
*H04L 67/1095* (2022.01)

(52) U.S. Cl.
CPC ...... *H04L 67/1095* (2013.01); *H04L 12/4633* (2013.01); *H04L 43/02* (2013.01)

(58) Field of Classification Search
CPC . H04L 67/1095; H04L 12/4633; H04L 43/02; H04L 12/4641; H04L 47/20; H04L 69/161; H04L 63/0428; G06N 5/04; H03M 7/6064
See application file for complete search history.

(56) References Cited

U.S. PATENT DOCUMENTS

| 2005/0220091 | A1* | 10/2005 | LaVigne | H04L 69/161 370/389 |
| 2005/0278565 | A1* | 12/2005 | Frattura | H04L 63/0428 714/5.1 |
| 2021/0135684 | A1* | 5/2021 | Lamparter | H03M 7/6064 |
| 2021/0160275 | A1* | 5/2021 | Anderson | G06N 5/04 |

(Continued)

OTHER PUBLICATIONS

Foschiano, M. "Cisco Systems' Encapsulated Remote Switch Port Analyzer (ERSPAN)", Oct. 2014, 15 pgs.

(Continued)

*Primary Examiner* — Vinncelas Louis
(74) *Attorney, Agent, or Firm* — LOZA & LOZA, LLP

(57) ABSTRACT

Methods and systems for implementing traffic mirroring for network telemetry are disclosed. An embodiment of a method for implementing traffic mirroring for network telemetry involves identifying network traffic at a network appliance that is to be subjected to traffic mirroring for network telemetry, and selecting from available options of transmitting enhanced mirrored network traffic from the network appliance to a collector, wherein the enhanced mirrored network traffic is generated at the network appliance by at least one of compressing and encrypting the network traffic, and transmitting mirrored network traffic from the network appliance to the collector without compressing or encrypting the network traffic.

21 Claims, 12 Drawing Sheets

(56) References Cited

U.S. PATENT DOCUMENTS

2021/0306166 A1* 9/2021 Piasetzky ............ H04L 12/4633
2022/0200910 A1* 6/2022 Baldi ...................... H04L 47/20

OTHER PUBLICATIONS

Foschiano, M. et al. "Cisco Systems' Encapsulated Remote Switch Port Analyzer (ERSPAN)", Feb. 2017, 17 pgs.
Pensando, "Distributed Services Platform for the Enterprise", Product Brief, Rev. 4, (2020), 5 pgs.
Hauser, Frederik et al. "P4-IPsec: Site-to-Site and Host-to-Site VPN with IPsec in P4-Based SDN", Jul. 5, 2020, 18 pgs.
New H3C Technologies Co., "Telemetry Technology White Paper", (2020), 17 pgs.

* cited by examiner

METHODS AND SYSTEMS FOR IMPLEMENTING TRAFFIC MIRRORING FOR NETWORK TELEMETRY

BACKGROUND

In a network, such as a cloud or data center network, packet traffic may move east-west between hosts in the network and/or north-south between hosts in the network and remote hosts connected via a wide area network (WAN) such as the Internet. Movement of packet traffic to and from a host may involve traversing a Network Interface Card (NIC). NICs with enhanced capabilities, sometimes, referred to as "SmartNICs," are being deployed in networks and often times the NICs perform additional tasks beyond traditional traffic forwarding functionality. For example, NICs may identify and mirror certain network traffic for network telemetry (e.g., Switch Port Analyzer (SPAN), Remote SPAN (RSPAN), Encapsulated RSPAN (ERSPAN)). Although traffic mirroring works well for network telemetry, the mirrored traffic can be a significant burden on resources associated with the mirroring.

SUMMARY

Methods and systems for implementing traffic mirroring for network telemetry are disclosed. An embodiment of a method for implementing traffic mirroring for network telemetry involves identifying network traffic at a network appliance that is to be subjected to traffic mirroring for network telemetry, and selecting from available options of transmitting enhanced mirrored network traffic from the network appliance to a collector, wherein the enhanced mirrored network traffic is generated at the network appliance by at least one of compressing and encrypting the network traffic, and transmitting mirrored network traffic from the network appliance to the collector without compressing or encrypting the network traffic.

In an embodiment, the enhanced mirrored network traffic is transmitted as ERSPAN encapsulated packets.

In an embodiment, selecting from available options involves selecting from available options in response to an availability of a compression engine of the network appliance.

In an embodiment, selecting from available options involves selecting from available options in response to an availability of an encryption engine of the network appliance.

In an embodiment, selecting from available options involves selecting from available options in response to a bandwidth on a link connected to the network appliance.

In an embodiment, selecting from available options involves selecting from available options in response to a bandwidth on a link that connects the network appliance and the collector.

In an embodiment, selecting from available options involves selecting from available options in response to a security parameter.

In an embodiment, selecting from available options involves the network appliance learning a capability of the collector and selecting from available options based on the capability of the collector that is learned by the network appliance.

In an embodiment, selecting from available options involves selecting from available options based at least on part on whether or not the collector can decompress network traffic.

In an embodiment, selecting from available options involves selecting from available options based at least on part on whether or not the collector can decrypt network traffic.

In an embodiment, the enhanced mirrored network traffic is generated at the network appliance by compressing an entire payload of a telemetry packet.

In an embodiment, the enhanced mirrored network traffic is generated to include a header field that indicates whether mirrored network traffic is compressed. In an embodiment, the header field is in a reserved field or in a platform specific subheader of a ERSPAN header.

In an embodiment, the enhanced mirrored network traffic includes a decompression parameter embedded in a payload portion an ERSPAN encapsulated packet.

In an embodiment, the enhanced mirrored network traffic is generated to include a header field that indicates whether mirrored network traffic is encrypted. In an embodiment, the header field is in a reserved field or in a platform specific subheader of a ERSPAN header.

In an embodiment, the enhanced mirrored network traffic includes a decryption parameter embedded in a payload portion an ERSPAN encapsulated packet.

In an embodiment, the enhanced mirrored network traffic includes multiple compressed original mirrored packets in a single telemetry packet.

In an embodiment, the enhanced mirrored network traffic includes multiple compressed original mirrored packets in a single ERSPAN encapsulated packet.

In an embodiment, the enhanced mirrored network traffic includes multiple telemetry packets that carry portions of the same original mirrored packet.

In another embodiment, a non-transitory computer readable medium that stored computer readable instructions, which when executed by one or more processors implements a method for implementing traffic mirroring for network telemetry, is disclosed. The method involves identifying network traffic at a network appliance that is to be subjected to traffic mirroring for network telemetry, and selecting from available options of transmitting enhanced mirrored network traffic from the network appliance to a collector, wherein the enhanced mirrored network traffic is generated at the network appliance by at least one of compressing and encrypting the network traffic, and transmitting mirrored network traffic from the network appliance to the collector without compressing or encrypting the network traffic.

In another embodiment, a network appliance is disclosed. The network appliance includes a network interface, a PCIe interface, memory, and a processor configured to identify network traffic at a network appliance that is to be subjected to traffic mirroring for network telemetry, and select from available options of generating enhanced mirrored network traffic by at least one of compressing and encrypting the network traffic at the network appliance, and transmitting the enhanced mirrored network traffic from the network appliance to a collector, and transmitting mirrored network traffic from the network appliance to the collector without compressing or encrypting the network traffic.

In an embodiment, the enhanced mirrored network traffic is transmitted as ERSPAN encapsulated packets.

Other aspects in accordance with the invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

Figure 1:
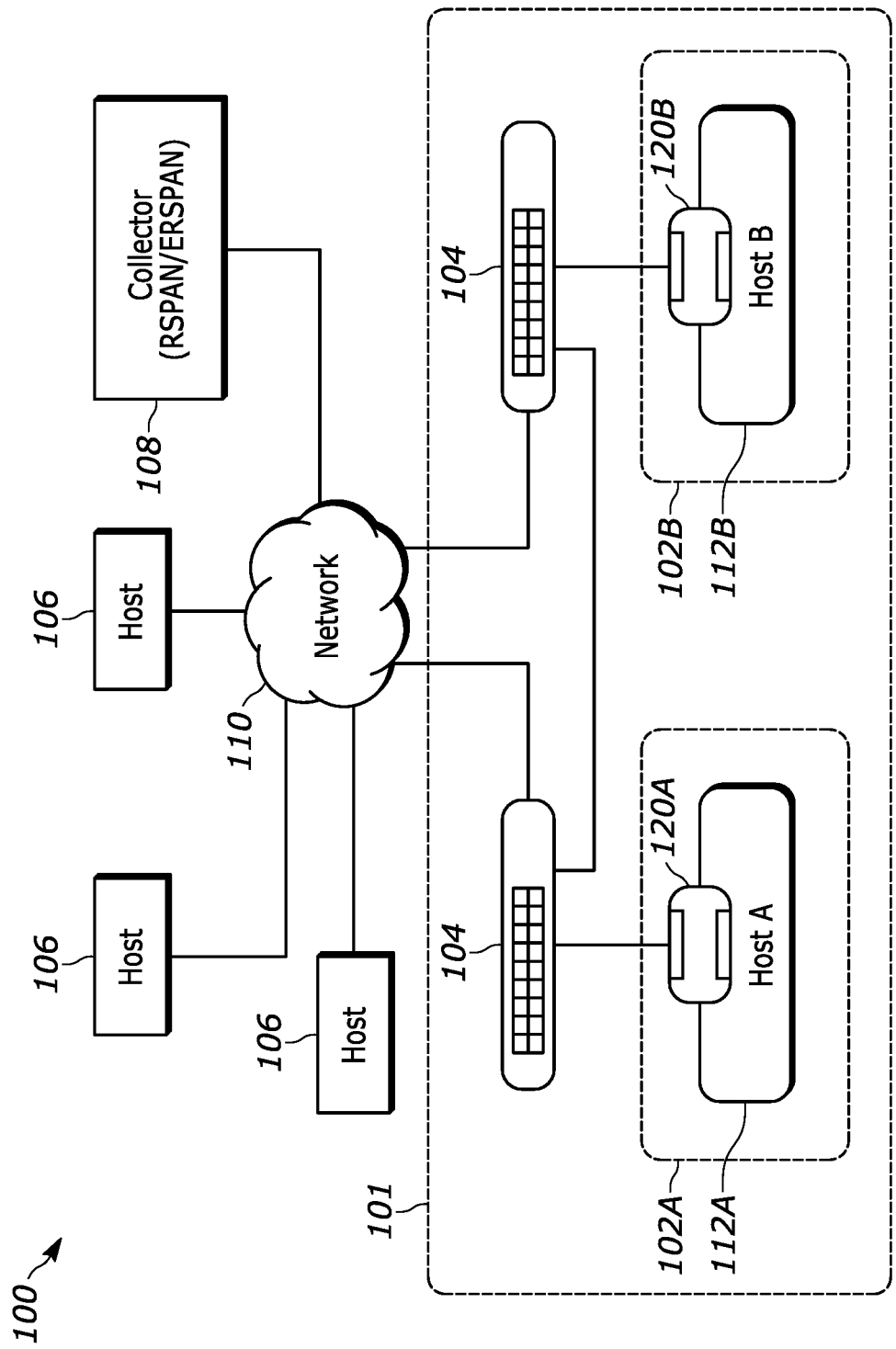
FIG. 1 depicts an example network architecture that includes a data center network connected to remote hosts and to a Collector by a network, such as the Internet.

FIG. 1 depicts an example network architecture 100 that includes a data center network 101 connected to remote hosts 106 and to a Collector 108 by a network 110, such as the Internet. In the embodiment of FIG. 1, the data center network includes host computing systems 102A and 102B and switches 104 (e.g., "Top-of-Rack" (ToR) switches) and the host computing systems include a host computer 112A and 112B and Network Interface Cards (NICs) 120A and 120B. Although the NICs are referred to as NICs throughout the description, it should be understood that the NICs may be referred to more generally as network appliances, which may include an edge device, a switch, a router, or some other I/O system that forms part of a packet-based network. The host computers may include, for example, a storage server, a computer server, a single processor, multiple processors, storage, primarily compute, and/or primarily storage.

In an embodiment, the data center network 101 includes components that interconnect data center resources such as compute and storage servers. The data center network may utilize various data center architectures, such as, three-tier data center network, fat tree data center network, and DCell. Although in one example, the network is a data center network, the network that connects the host computing systems 102A and 102B, including the NICs 120A and 120B, to the remote hosts 106 may be another type of LAN and/or WAN.

In an embodiment, the ToR switches 104 are network switches that are commonly used to connect to servers in a data center network. In at least one example, at least one switch is placed in a rack of servers and the servers in the rack are connected to the switch by copper wire cables, e.g., Ethernet cables. Although the switches are referred to herein as "ToR" switches, the switches may be deployed relative to host computers (e.g., servers) in other ways. For example, the switches may be "leaf" switches in a deployment that includes "spine" switches and leaf switches. In another example, the ToR switches may be routers or other general intermediate systems that forward data between hosts in a network.

The remote hosts 106 may include computer systems such as storage servers, computer servers, a single processor, and/or multiple processors. The remote hosts may be primarily compute or primarily storage and in other embodiments, the remote hosts may be any computing device that is able to send or receive digital data packets. The remote hosts have a network interface that enables the remote hosts to be accessed through a network connection.

In an embodiment, the Collector 108 receives mirrored packet traffic or traffic related telemetry data or other data transmitted from the NICs 120A and 120B of the host computing systems 102A and 102B, respectively. The Collector may be configured to collect and analyze packet traffic and other data received from the host computing systems. Although the Collector may support SPAN, RSPAN, and/or ERSPAN, these are just examples of mirroring protocols that may be implemented with the Collector or by some other similarly situated network element. In other embodiments, a telemetry collector or a flow information collector (e.g., NetFlow or IP Flow Information eXport (IPFIX)) may be used in place of, or in addition to, the Collector. Additionally, although only one Collector is shown in FIG. 1, there may be more than one Collector connected to the host computing systems.

Figure 2A:
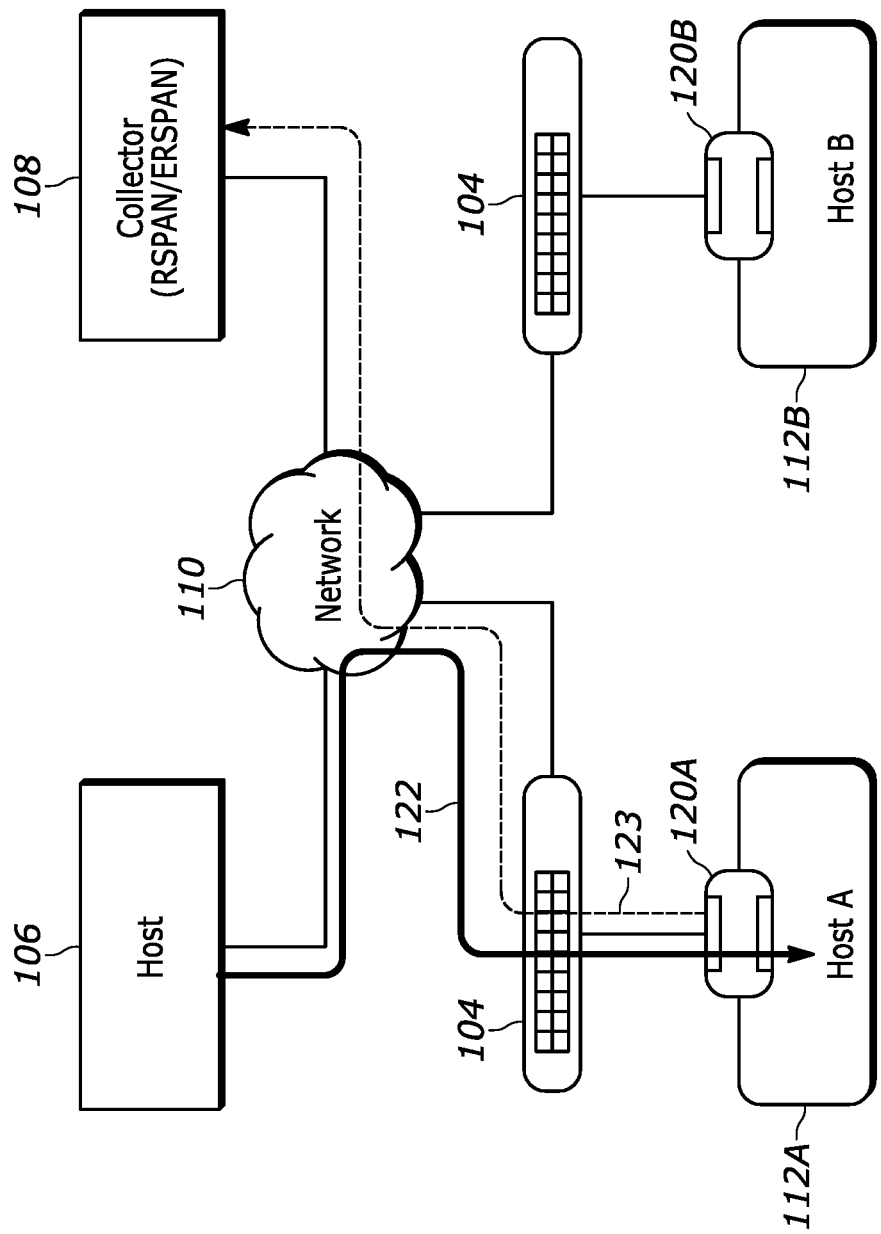
FIG. 2A illustrates a flow of network traffic from a remote host to a host along with mirrored network traffic from the host to a Collector.
Figure 2B:
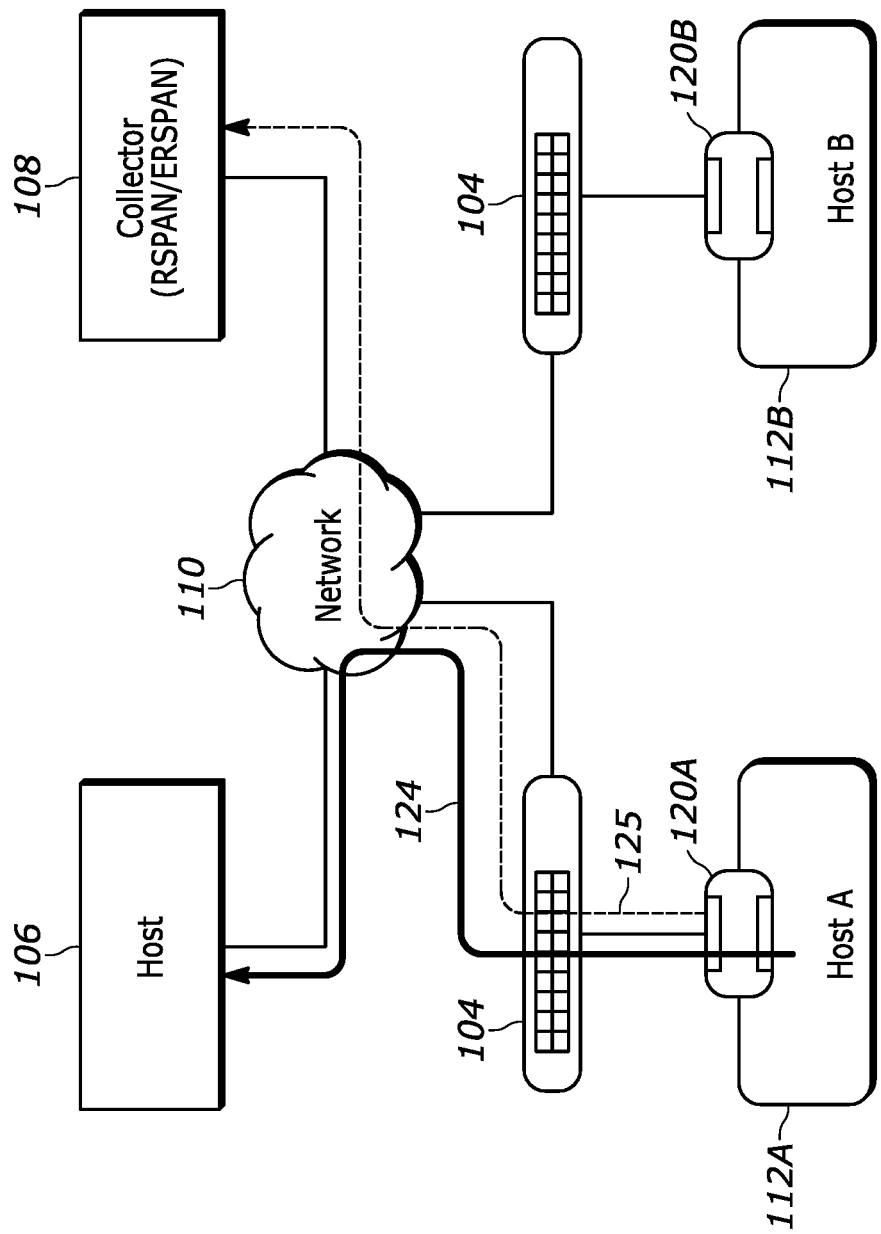
FIG. 2B illustrates a flow of network traffic from a host to a remote host along with mirrored network traffic from the host to a Collector.

In some use cases in the network architecture 100 described with reference to FIG. 1, it may be desirable to have the NICs 120A and 120B perform a task such as port mirroring, which is not directly related to forwarding packet traffic through the network. For example, it may be desirable to direct the NICs to mirror all packet traffic from a particular flow, e.g., all traffic having the same 5-tuple. FIG. 2A illustrates, via dashed-line arrow 122, a case in which a flow of network traffic (e.g., packet traffic with the same 5-tuple) is transmitted from a remote host 106 to host A 112A via the NIC 120A. FIG. 2A also illustrates, via dashed-line arrow 123, that the NIC 120A mirrors the received network traffic by transmitting the network traffic to the Collector 108. FIG. 2B illustrates, via dashed-line arrow 124, a case in which a flow of network traffic (e.g., packet traffic with the same 5-tuple) is transmitted from host A to the remote host 106. FIG. 2B also illustrates, via dashed-line arrow 125, that the NIC 120A mirrors the transmitted network traffic to the Collector 108. In both of the cases illustrated in FIGS. 2A and 2B, whether the network traffic is incoming or outgoing with regard to the NIC 120A, the network traffic is mirrored using ERSPAN. For example, original packets of the network traffic are encapsulated as ERSPAN Type II encapsulated packets (referred to herein as "ERSPAN encapsulated packets") and sent to the Collector 108. Although ERSPAN Type II encapsulation is mentioned, other encapsulations are possible, including ERSPAN Type I, ERSPAN Type III and a modified version of ERSPAN Type I, II, or III encapsulation.

Figure 3A:
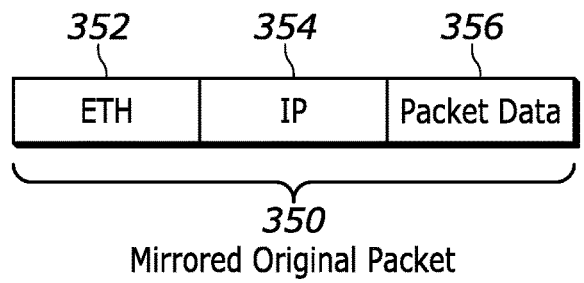
FIG. 3A depicts an example of an original packet.
Figure 3B:
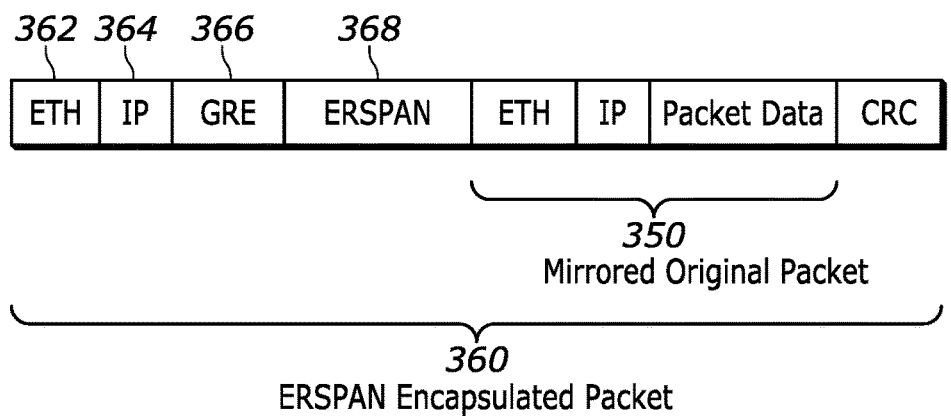
FIG. 3B depicts an example of the original packet encapsulated as an ERSPAN encapsulated packet.

FIG. 3A depicts an example of a mirrored original packet 350 (e.g., a copy of the original packet received at the NIC) and FIG. 3B depicts an example of the mirrored original packet encapsulated as an ERSPAN encapsulated packet 352. With reference to FIG. 3A, the original packet is shown as including an Ethernet header 354 (e.g., Layer 2), an IP header 356 (e.g., IPv4, Layer 3), and packet or payload data 356, which may also include higher layer header information including transport layer (e.g., Layer 4) info and application layer (e.g., Layer 7) information. In an embodiment, the mirrored original packet 350 corresponds to a packet of the traffic flows 122 and 124 as illustrated in FIGS. 2A and 2B, respectively, between host A 112A and the remote host 106.

FIG. 3B depicts an ERSPAN encapsulated packet 360 that includes the mirrored original packet 350 from FIG. 3A encapsulated within an Ethernet header 362 (ETH), an IP header 364, a Generic Routing Encapsulation (GRE) header 366, and an ERSPAN header 368. In an embodiment, the ERSPAN encapsulated packet 360 corresponds to a packet of the mirrored network traffic 123 and 125 as illustrated in FIGS. 2A and 2B, respectively, between host A 112A and the Collector 106.

Figure 3C:
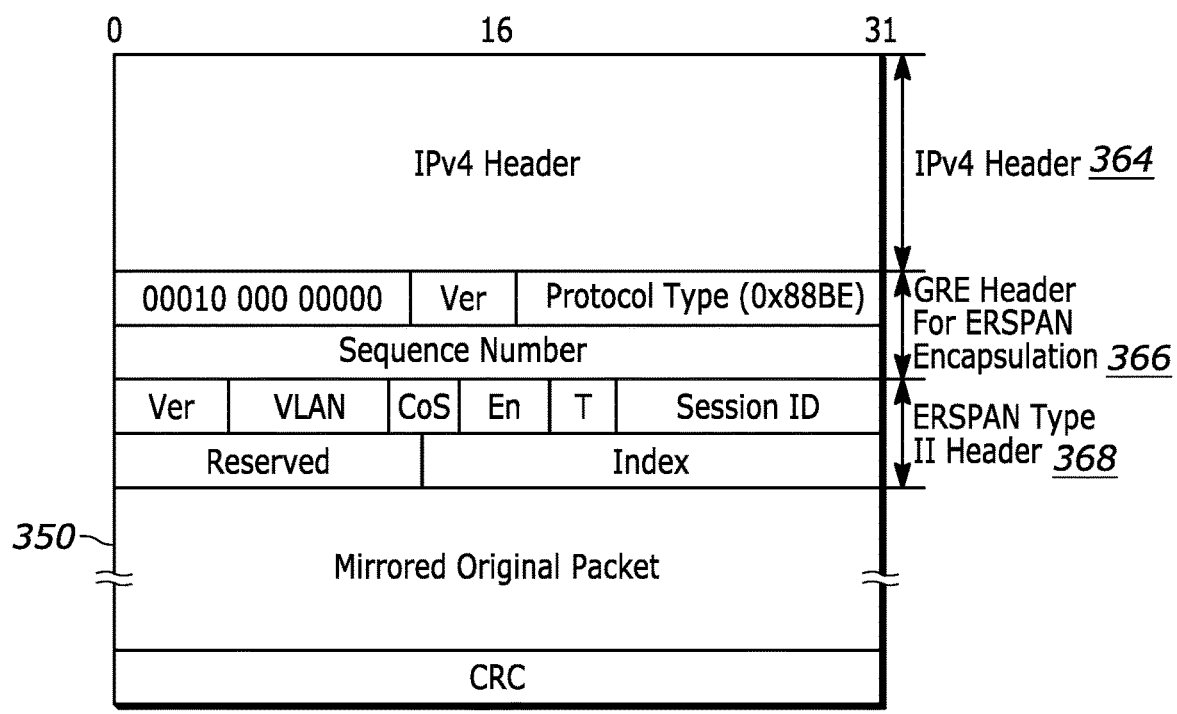
FIG. 3C is an expanded view of the IP, GRE, and ERSPAN headers of the ERSPAN encapsulated packet shown in FIG. 3B.

FIG. 3C is an expanded view of the IP 364, GRE 366, and ERSPAN 368 headers of the ERSPAN encapsulated packet 360 shown in FIG. 3B. As shown in FIG. 3C, the IP header (e.g., IPv4) is 32 bits of source IP address and 32 bits of destination IP address, the GRE header for ERSPAN encapsulation is 64-bits (13 bits C, K, S, and reserved, 3 bits version, 16 bits protocol, and 32 bits sequence number), and the ERSPAN Type II header is 64 bits (4 bits version, 12 bits VLAN, 3 bits Class of Service (CoS), 2 bits Trunk encapsulation type (En), 1 bit Truncated (T), 10 bits Session ID, 12 bits reserved, and 20 bits Index). The ERSPAN encapsulated packet includes the mirrored original packet and a CRC as shown in FIG. 3B. Although ERSPAN Type II encapsulation is described with reference to FIG. 3C, other encapsulations are possible, including ERSPAN Type I, ERSPAN Type III and a modified version of ERSPAN Type I, II, or III encapsulation.

As described with reference to FIGS. 2A and 2B, network traffic 122 and 124 can be mirrored by a NIC and provided to a Collector using a protocol such as ERSPAN. While mirroring network traffic for network telemetry works well to provide information about network traffic to a Collector, mirroring network traffic consumes valuable resources including, for example, resources of the NIC and the host and resources of the link between the host and the Collector. As described above, NICs may include enhanced capabilities such as compression/decompression capabilities and encryption/decryption capabilities. Although such enhanced capabilities may be supported by a NIC, certain circumstances may influence whether or not such enhanced capabilities may be desirable to apply to mirrored network traffic for network telemetry. It has been realized that providing flexibility in the application of compression and/or encryption to mirrored network traffic by a network appliance such as a NIC can enable enhanced network telemetry features while efficiently utilizing network resources. In accordance with an embodiment of the invention, a method for implementing traffic mirroring for network telemetry involves identifying network traffic at a network appliance that is to be subjected to traffic mirroring for network telemetry, and selecting from available options of 1) transmitting enhanced mirrored network traffic from the network appliance to a collector, wherein the enhanced mirrored network traffic is generated at the network appliance by at least one of compressing and encrypting the network traffic, and 2) transmitting mirrored network traffic from the network appliance to the collector without compressing or encrypting the network traffic.

In an embodiment, the decision of which option to select is based on resource utilization at the network appliance. For example, a decision of whether or not to compress traffic may be based on real-time information regarding utilization of a compression engine of the network appliance such that mirrored network traffic is compressed if the compression engine currently has available capacity and left uncompressed if the compression engine does not currently have available capacity. Likewise, a decision of whether or not to encrypt mirrored network traffic may be based on real-time information regarding utilization of an encryption engine of the network appliance such that mirrored network traffic is encrypted if an encryption engine currently has available capacity and left unencrypted if the encryption engine does not currently have available capacity.

In another embodiment, the decision of what option to select is based on a condition, or conditions, related to the network. For example, compression of the mirrored traffic may be utilized if link bandwidth is scarce and/or encryption of the mirrored traffic may be utilized when security is a priority.

In still another embodiment, the decision of what option to select is based at least in part on the capability of the Collector that is to receive the mirrored network traffic. For example, the network appliance may learn the decompression and/or decryption capabilities of the Collector during an exchange with the Collector such that the decision of what option to select is at least partially influenced by the capabilities of the Collector. For example, the network appliance will not compress the mirrored network traffic under any circumstances if the Collector is not able to decompress the traffic and/or the network appliance will not encrypt the mirrored network traffic under any circumstances if the Collector is not able to decrypt the mirrored network traffic.

In another embodiment, generating enhanced mirrored network traffic may involve compressing and/or encrypting only a portion of an original packet that is encapsulated as, for example, an ERSPAN encapsulated packet while in other embodiments, generating enhanced mirrored network traffic may involve compressing and/or encrypting the entire original packet that is encapsulated as an ERSPAN encapsulated packet.

In another embodiment, generating enhanced mirrored network traffic may involve embedding an indication in the ERSPAN encapsulated packet as to whether or not the mirrored network traffic is compressed and/or encrypted.

In another embodiment, generating enhanced mirrored network traffic may involve embedding a decompression and/or decryption parameter in the ERSPAN encapsulated packet that can be used by the collector to decompress and/or decrypt the mirrored network traffic.

Figure 4:
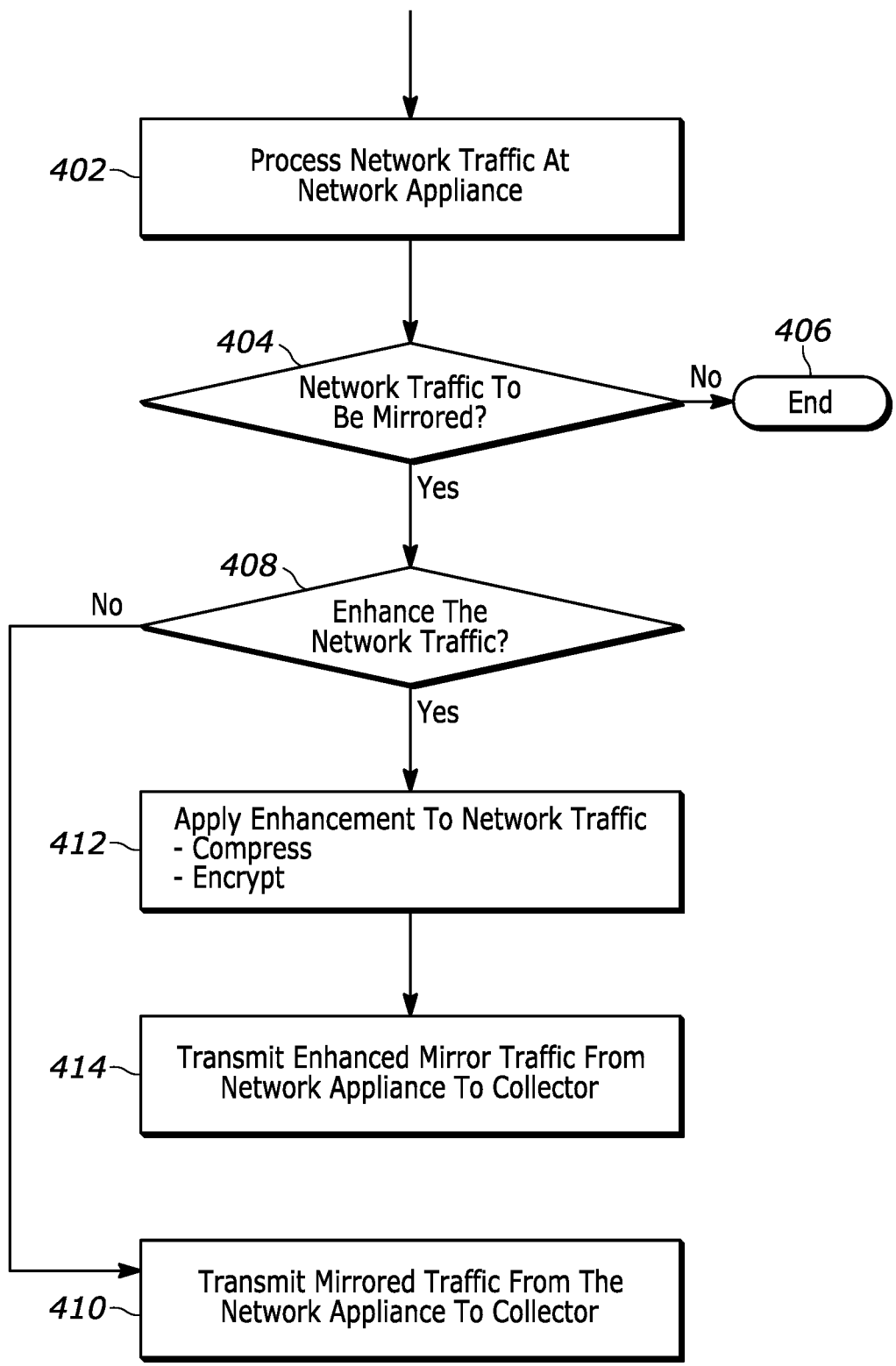
FIG. 4 is a process flow diagram of a technique for managing network traffic that can be implemented at a network appliance.

As described above, a network appliance such as a NIC, selects how to handle network traffic that is to be subjected to traffic mirroring for network telemetry. FIG. 4 is a process flow diagram of a technique for managing network traffic that can be implemented at a network appliance. At block 402, network traffic is processed at the network appliance. For example, the processing may include receiving and transmitting network traffic. At decision point 404, it is determined whether or not the network traffic should be mirrored. If it is determined that the network traffic should not be mirrored, then the process ends 406. If it is determined that the network traffic should be mirrored, then at decision point 408, it is determined whether or not the traffic should be enhanced before being mirrored. If it is determined that the traffic should not be enhanced before mirroring, then at block 410, the network traffic is transmitted from the network appliance to a Collector. If it is determined at decision point 408 that the traffic should be enhanced before mirroring, then at block 412, an enhancement is applied to the network traffic. For example, the network traffic is compressed and/or encrypted. At block 414, once the enhancement is applied, the network traffic is transmitted to the Collector.

Figure 5:
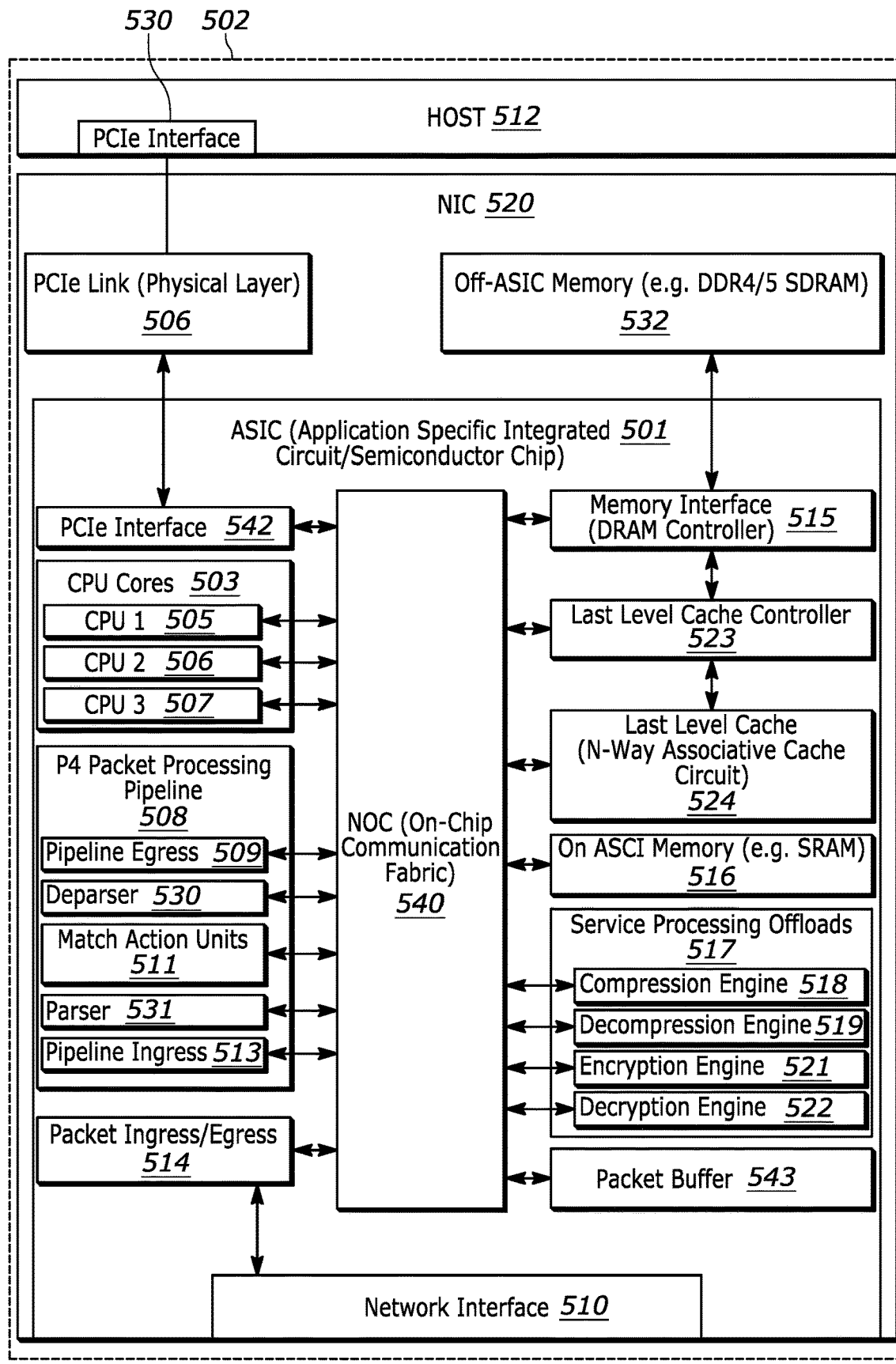
FIG. 5 depicts an example of a NIC that is connected to a host to form a host computing system.

In an embodiment, the traffic mirroring technique is implemented by a network appliance, which may be deployed as, for example, a NIC, an edge device, a switch, a router, or some other I/O system that forms part of a packet-based network. FIG. 5 depicts an example of a NIC 520 that is connected to a host 512 to form a host computing system 502 similar to the host computing systems described with reference to FIGS. 1, 2A, and 2B. For example, the NIC 520 can be one of the NICs 120A and 120B in FIGS. 1, 2A, and 2B and the host 512 is one of the host computers 112A and 112B of one of the host computing systems 102A and 102B. FIG. 5 is a functional block diagram of a NIC having an application specific integrated circuit (ASIC) 501, according to some aspects. The NIC includes a PCIe link 506 and can be connected to a PCIe interface 530 of the host computer 512, referred to herein as simply the host. The NIC can provide network services to the host and to virtual machines (VMs) running on the host. The NIC includes an off-ASIC memory 532, and a network interface 510, e.g., Ethernet ports. The off-ASIC memory can be one of the widely available memory modules or chips such as DDR4 SDRAM modules or DDR5 SDRAM modules such that the ASIC has access to many gigabytes of memory. The network interface provides physical connectivity to a computer network such as the Internet.

The ASIC 501 is a semiconductor chip having many core circuits interconnected by an on-chip communications fabric, sometimes called a network on a chip (NOC) 540. NOCs are often implementations of standardized communications fabrics such as the widely used advanced extensible interface (AXI) bus. The ASIC's core circuits can include a PCIe interface 542, central processing unit (CPU) cores 503, P4 packet processing pipeline 508 elements, memory interface 515, on ASIC memory (e.g., SRAM) 516, service processing offloads 517, a packet buffer 543, and packet ingress/egress circuits 514. The PCIe interface 542 can be used to communicate with the host via the PCIe link 506. The CPU cores 503 can include numerous CPU cores such as CPU 1 505, CPU 2 506, and CPU 3 507. The P4 packet processing pipeline 508 can include a pipeline ingress circuit 513, a parser circuit 531, match-action units 511, a deparser circuit 530, and a pipeline egress circuit 509. The service processing offloads 517 are circuits implementing functions that the ASIC uses so often that the designer has chosen to provide hardware for offloading those functions from the CPUs. The service processing offloads can include a compression engine 518, decompression engine 519, an encryption engine 521, and a decryption engine 522. In an embodiment, the compression and decompression engines are specialized circuits configured to implement data compression and data decompression, respectively, at speeds that can keep up with the speeds of the network interface 510. Likewise, the encryption and decryption engines are specialized circuits configured to implement data encryption and data decryption, respectively, at speeds that can keep up with the speeds of the network interface 510. The specific core circuits implemented within the non-limiting example of ASIC 501 have been selected such that the ASIC implements many, perhaps all, of the functionality of an InfiniBand channel adapter, of a non-volatile memory express (NVMe) card, and of a I/O system that processes network traffic flows carried by IP (internet protocol) packets.

The P4 packet processing pipeline 508 is a specialized set of elements for processing network packets such as IP packets, NVMe protocol data units (PDUs), and InfiniBand PDUs. The P4 pipeline can be configured using a domain-specific language. The concept of a domain-specific language for programming protocol-independent packet processors, known simply as "P4," has developed as a way to provide some flexibility at the data plane of a I/O system. The P4 domain-specific language for programming the data plane of I/O systems is defined in the "$P4_{16}$ Language Specification," version 1.2.0, as published by the P4 Language Consortium on Oct. 23, 2019. P4 (also referred to herein as the "P4 specification," the "P4 language," and the "P4 program") is designed to be implementable on a large variety of targets including network switches, network routers, programmable NICs, software switches, FPGAs, and ASICs. As described in the P4 specification, the primary abstractions provided by the P4 language relate to header types, parsers, tables, actions, match-action units, control flow, extern objects, user-defined metadata, and intrinsic metadata.

The memory interface 515 coordinates memory I/O operations to and from the off-ASIC memory 532. When the off-ASIC memory is DRAM, the memory controller may be called a DRAM controller. The ASIC can include a last level cache 524 and a last level cache controller 523. The last level cache 524 can include an N-way associative cache circuit. The last level cache controller 523 can include circuits for determining pool values, set values, tag values, cache hits, cache misses, etc. The last level cache 524 can be an N-way associative cache circuit that is used by DRAM controller 515 for caching DRAM input/output operations (a.k.a. memory I/O operations).

The CPU cores 503 can be general purpose processor cores, such as reduced instruction set computing (RISC) processor cores, advanced RISC machine (ARM) processor cores, microprocessor without interlocked pipeline stages (MIPS) processor cores, and/or x86 processor cores, as is known in the field. Each CPU core can include a memory interface, an ALU, a register bank, an instruction fetch unit, and an instruction decoder, which are configured to execute instructions independently of the other CPU cores. The CPU cores may be programmable using a general-purpose programming language such as C.

The CPU cores 503 can also include a bus interface, internal memory, and a memory management unit (MMU) and/or memory protection unit. For example, the CPU cores may include internal cache, e.g., L1 cache and/or L2 cache, and/or may have access to nearby L2 and/or L3 cache. Each CPU core may include core-specific L1 cache, including instruction-cache and data-cache and L2 cache that is specific to each CPU core or shared amongst a small number of CPU cores. L3 cache may also be available to the CPU cores.

There may be multiple CPU cores 503 available for control plane functions and for implementing aspects of a slow data path that includes software implemented packet processing functions. The CPU cores may be used to implement discrete packet processing operations such as L7 applications (e.g., HTTP load balancing, L7 firewalling, and/or L7 telemetry), certain InfiniBand channel adapter functions, flow table insertion or table management events, connection setup/management, multicast group join, deep packet inspection (DPI) (e.g., URL inspection), storage volume management (e.g., NVMe volume setup and/or management), encryption, decryption, compression, and decompression, caching, cache management, which may not be readily implementable through a domain-specific language such as P4, in a manner that provides fast path performance as is expected of data plane processing.

The packet buffer 543 can act as a central on-chip packet switch that delivers packets from the network interface 510 to packet processing elements of the data plane and vice-versa. The packet processing elements can include a slow data path implemented in software and a fast data path implemented by packet processing pipeline 508.

The packet processing pipeline 508 can be a specialized circuit or part of a specialized circuit implementing programmable packet processing pipelines. Some embodiments include a P4 pipeline as a fast data path within the I/O system. The fast data path is called the fast data path because it processes packets faster than a slow data path that can also be implemented within the I/O system. An example of a slow data path is a software implemented data path wherein the CPU cores 503 and memory 532 are configured via software to implement a slow data path.

All memory transactions in the NIC 502, including host memory transactions, on board memory transactions, and registers reads/writes may be performed via a coherent interconnect. In one non-limiting example, the coherent interconnect can be provided by a network on a chip (NOC) 540 "IP core" (in this one context, "IP" is an acronym for intellectual property). Semiconductor chip designers may license and use prequalified IP cores within their designs. Prequalified IP cores may be available from third parties for inclusion in chips produced using certain semiconductor fabrication processes. A number of vendors provide NOC IP cores. The NOC 540 may provide cache coherent interconnect between the NOC masters, including the packet processing pipeline circuits 508, CPU cores 503, memory interface 515, and the PCIe interface 542. The interconnect may distribute memory transactions across a plurality of memory interfaces using a programmable hash algorithm. All traffic targeting the memory may be stored in a NOC cache (e.g., 1 MB cache). The NOC cache may be kept coherent with the CPU core caches.

In an embodiment, the NIC 520 and the host 512 are connected via the PCIe interface 542, the PCIe link 506, and the PCIe interface 530. Although the interface between the NIC and the host is described as a PCIe interface, other high speed serial bus interfaces are possible.

Figure 6:
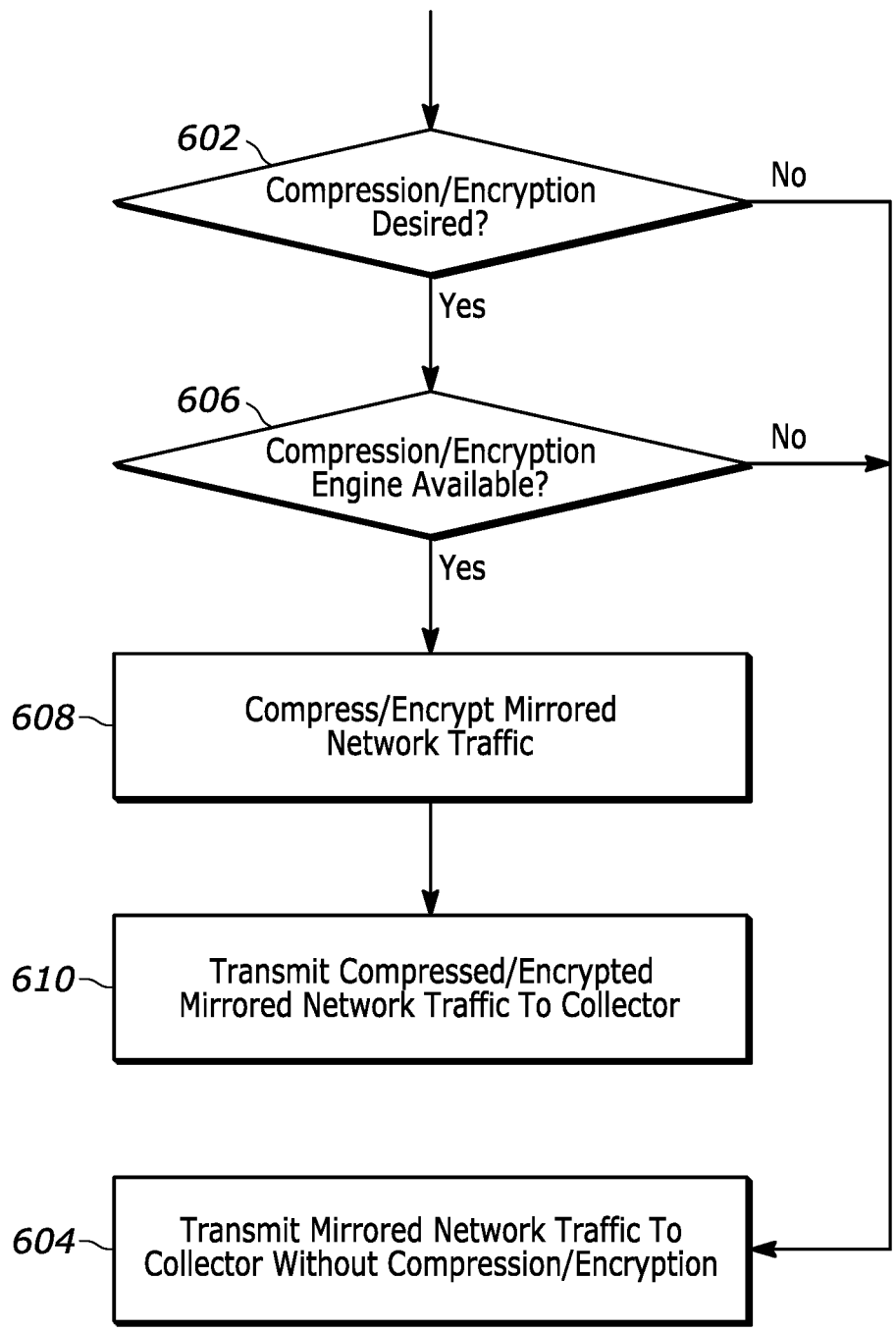
FIG. 6 is a process flow diagram of a technique for managing network traffic that can be implemented at a network appliance such as the NIC described with reference to FIG. 5.

In an embodiment, a decision of whether or not to compress/encrypt traffic may be based on real-time information regarding utilization of the compression engine 518 and/or the encryption engine 521 of the NIC 520 such that mirrored network traffic is compressed/encrypted if the compression/encryption engine currently has available capacity and left uncompressed/unencrypted if the compression/encryption engine does not currently have available capacity. FIG. 6 is a process flow diagram of a technique for managing network traffic that can be implemented at a network appliance such as the NIC described above. At decision point 602, it is determined whether or not compression/encryption is desired for mirrored network traffic. If it is determined that compression/encryption is not desired for the mirrored network traffic, then at block 604, the mirrored network traffic is transmitted to a Collector without compression/encryption. If at decision point 602 it is determined that compression/encryption is desired for the mirrored network traffic, then at decision point 606, it is determined if a compression/encryption engine is available. For example, it is determined if the on-chip compression/encryption engine has available compression/encryption capacity. In an embodiment, the determination with regard to compression/encryption availability may involve a comparison of a current compression/encryption workload to a compression/encryption workload threshold. If at decision point 606, it is determined that the compression/encryption engine is not available, then at block 604, the mirrored network traffic is transmitted to a Collector without compression/encryption. If at decision point 606, it is determined that the compression/encryption engine is available, then at block 608, the mirrored network traffic is compressed/ encrypted and then at block 610, the compressed/encrypted mirrored network traffic is transmitted to the Collector. Such a decision with regard to compression/encryption engine availability may be based on real-time "on-chip" feedback information regarding utilization of the compression/encryption engine that is integrated into the ASIC 501 of the NIC 520 as described with reference to FIG. 5.

Figure 7:
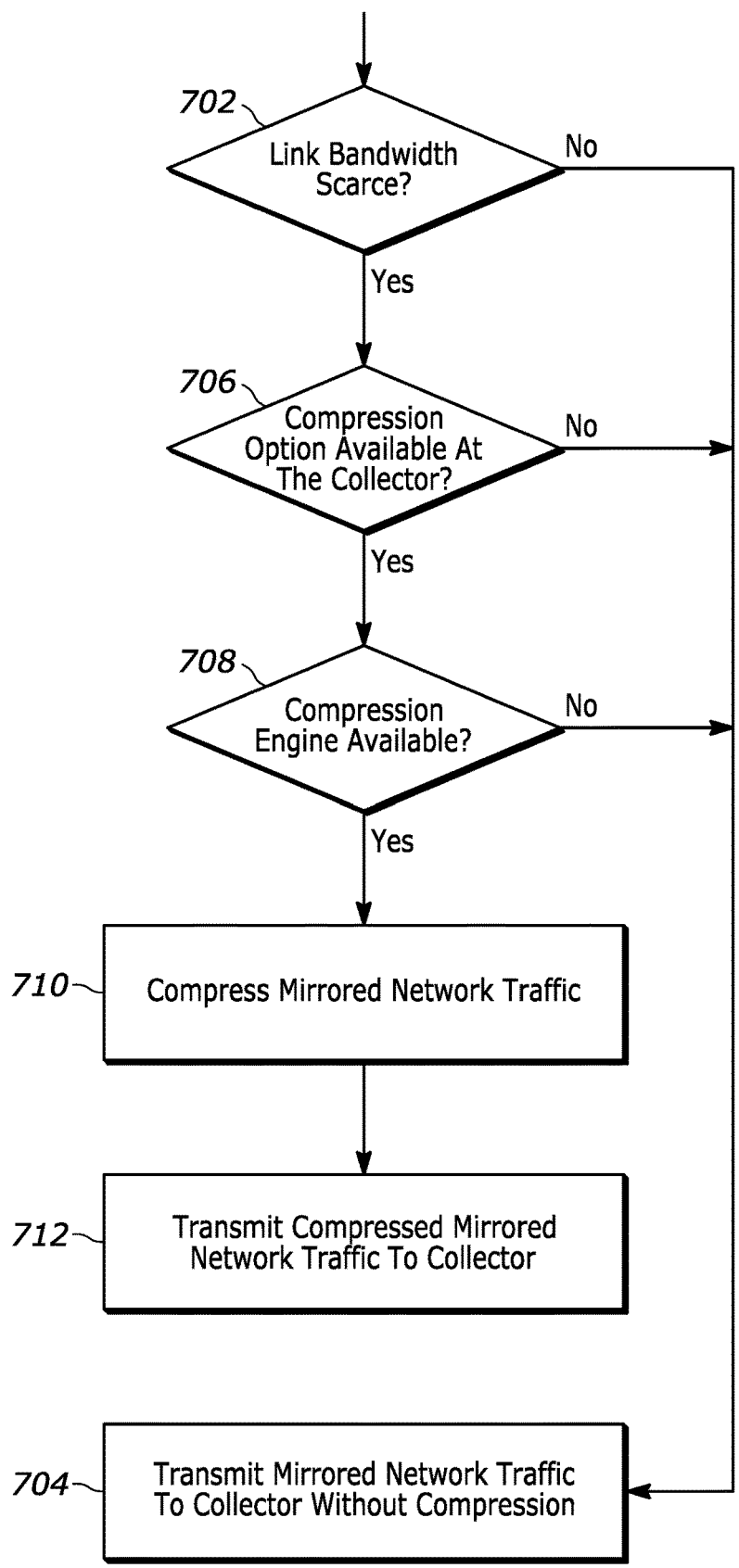
FIG. 7 is a process flow diagram of a technique for managing network traffic that can be implemented at a network appliance such as the NIC described with reference to FIG. 5.

In another embodiment, the decision of whether or not to compress the mirrored network traffic is made by the NIC in response to various parameters. FIG. 7 is a process flow diagram of a technique for managing network traffic that can be implemented at a network appliance such as the NIC described with reference to FIG. 5. At decision point 702, it is determined if link bandwidth is scarce. For example, the network appliance may make such a determination based on internal knowledge of the bandwidth that is being consumed on its network links. Additionally, the scarcity of link bandwidth may be determined by the network appliance relative to a threshold percentage and a maximum link bandwidth. If is determined that link bandwidth is not scarce, then at block 704, mirrored network traffic is transmitted to a Collector without compression. If it is determined that link bandwidth is scarce, then at decision point 706, it is determined if the compression option is available at the Collector. If the Collector is not able to decompress network traffic, then the compression option is likely not available and the process proceeds to block 704. If the compression option is available, then at decision point 708, it is determined if the compression engine of the network appliance is available. In an embodiment, the determination with regard to compression availability may involve a comparison of a current compression workload on the compression engine to a compression workload threshold. If the compression engine of the network appliance is not available (e.g., the compression engine does not currently have available workload availability), then the process proceeds to block 704. If at decision point 708 if is determined that the compression engine is available, then at block 710, the mirrored network traffic is compressed and then at block 712, the compressed mirrored network traffic is transmitted to the Collector.

As described above, there may be different criteria used by the network appliance (e.g., by the NIC) in selecting between the available options of enhancing the mirrored network traffic with compression and/or encryption or not enhancing the mirrored network traffic with compression and/or encryption. In addition to the criteria used to select between the available options, the technique for implementing traffic mirroring may involve utilizing other features that may be beneficial in network telemetry.

Figure 8:
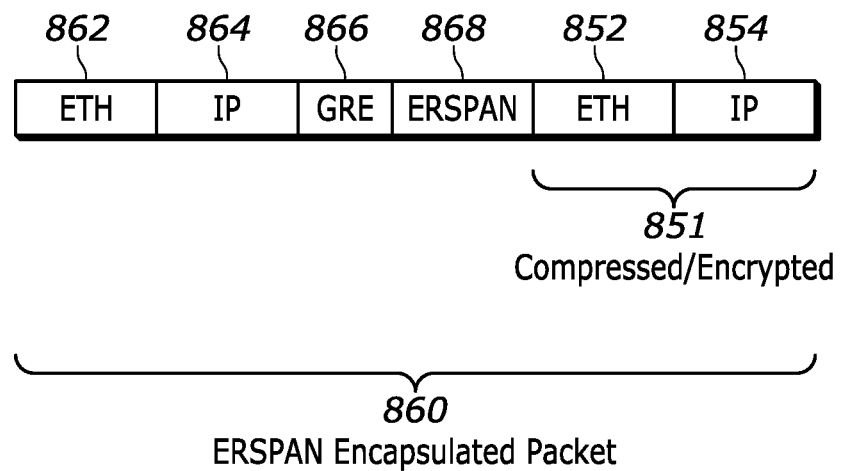
FIG. 8 depicts an ERSPAN encapsulated packet in which a truncated portion of the original packet is encapsulated.

In some cases, the mirrored original packet is truncated such that only a portion of the original packet is compressed/ encrypted in the ERSPAN header. For example, header information including L1-L7 information from the original packet may be encapsulated in the ERSPAN encapsulated packet but a data/payload portion of the original packet is not included in the ERSPAN encapsulated packet. The included portion of the original packet can be compressed/ encrypted as dictated by corresponding rules that are executed by the NIC. FIG. 8 depicts an ERSPAN encapsulated packet 860 (including the ETH 862, IP 864, GRE 866, and ERSPAN 868 headers) in which a truncated portion of the mirrored original packet 851 is encapsulated. In particular, the truncated portion of the original packet includes only the Ethernet header 852 and the IP header 854 and the truncated portion is compressed and/or encrypted.

Figure 9:
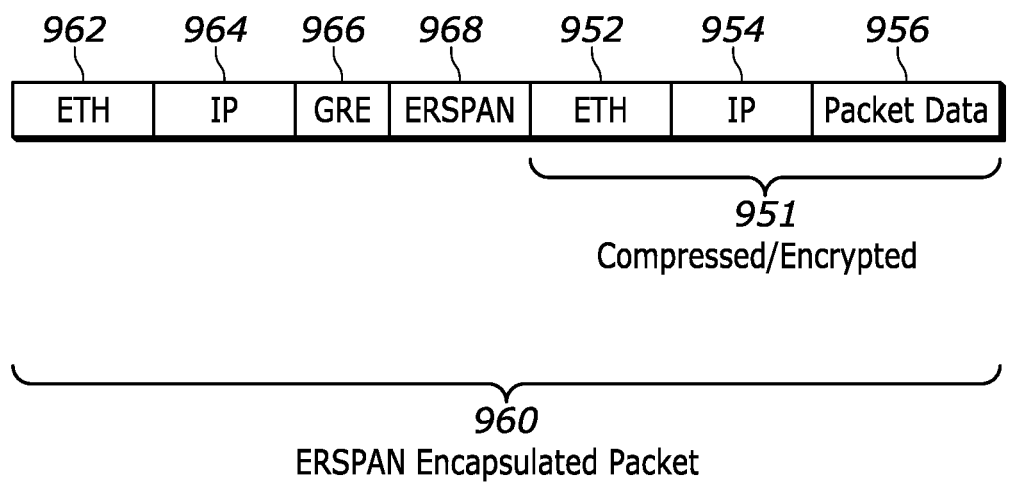
FIG. 9 depicts an ERSPAN encapsulated packet in which the entire original packet is encapsulated in the ERSPAN encapsulated packet.

In some embodiments, the entire mirrored original packet is encapsulated within the ERSPAN encapsulated packet. FIG. 9 depicts an ERSPAN encapsulated packet 960 (including the ETH 962, IP 964, GRE 966, and ERSPAN 968 headers) in which the entire mirrored original packet (including the ETH 952 and IP 954 headers and the payload 956) is encapsulated in the ERSPAN encapsulated packet. In the example of FIG. 9, the entire mirrored original packet is compressed and/or encrypted as the payload of the ERSPAN encapsulated packet. In an embodiment, compressing the entire contents of each packet in a flow of packets allows the Collector to have a complete view of the flow of network traffic while consuming less bandwidth than would be required to mirror each packet from the flow of packets without compression. Mirroring original packets in their entirety can enable use cases, such as deep packet data mining, that heretofore have been cost prohibitive to implement through mirroring. In another embodiment, compression of original packets enables an extremely large original packet to be encapsulated in a single ERSPAN encapsulated packet. For example, a MTU sized packet (e.g., 9,000 bytes) could be compressed down to fit into an acceptable sized ERSPAN encapsulated packet (e.g., 1,500 bytes).

Figure 10:
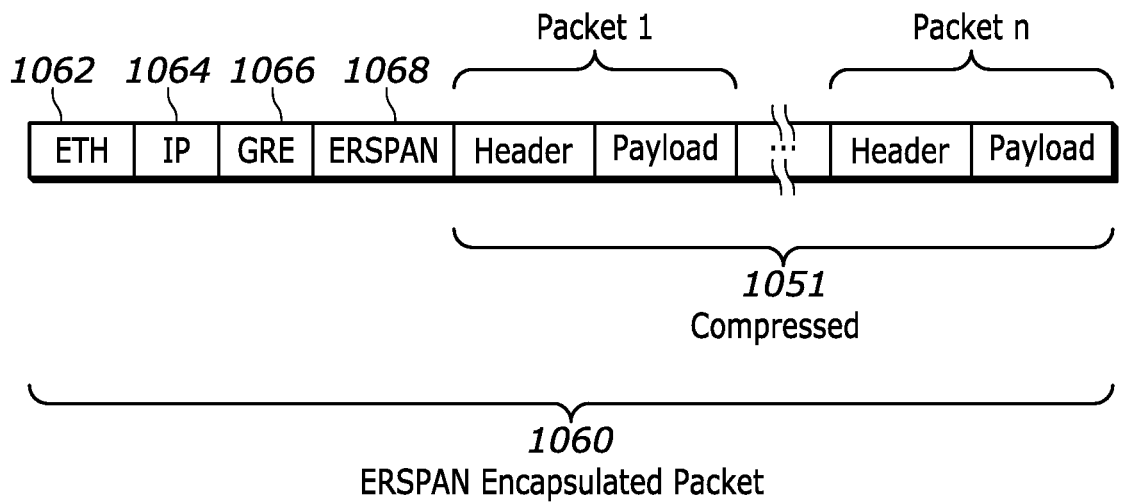
FIG. 10 depicts multiple compressed original packets encapsulated within the same ERSPAN encapsulated packet.

In another embodiment, compression of original packets may enable multiple packets to be encapsulated within the same ERSPAN encapsulated packet. FIG. 10 depicts multiple compressed original packets 1051 (e.g., packets 1 to n, where n is an integer greater than 1) encapsulated within the same ERSPAN encapsulated packet 1060 (including the ETH 1062, IP 1064, GRE 1066, and ERSPAN 1068 headers), where each encapsulated packet includes a header and a payload. In an example, at a compression ratio of 90:1 (e.g., MPEG compression), around 90 original packets of 1,500 bytes each may be included within a typical 1,500 byte encapsulated packet. Thus, the number of compressed original packets that can be incorporated into the same ERSPAN encapsulated packet may be function of the compression ratio.

Figure 11:
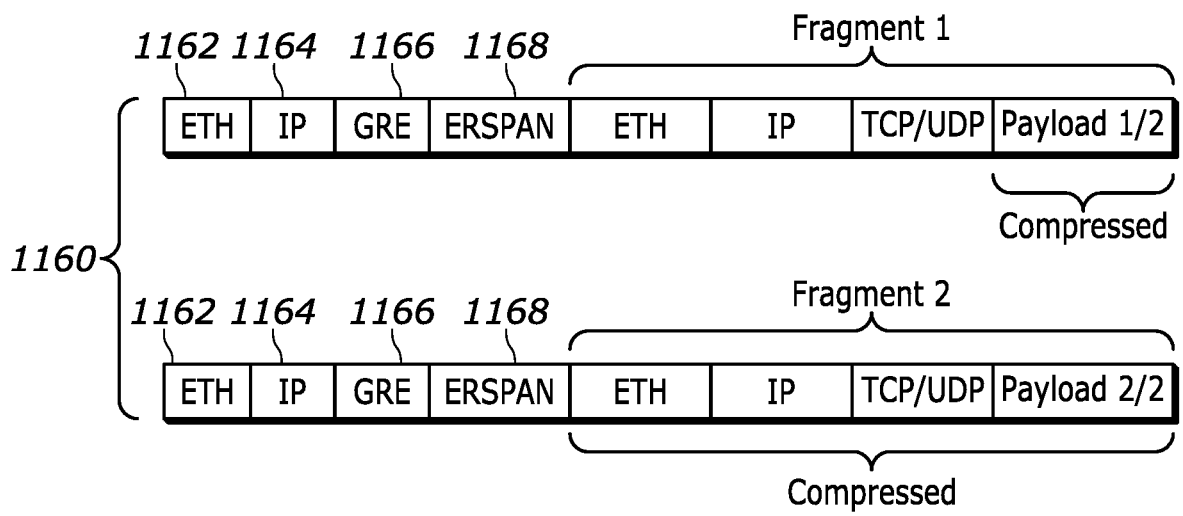
FIG. 11 depicts a large original packet that has been broken up into two fragments in which the header portion of the original packet is uncompressed and the payload portion of the original packet is compressed at the network appliance.

In another embodiment, a large packet (e.g., an MTU sized packet) may be broken up into multiple fragments that are separately carried in ERSPAN encapsulated packets. FIG. 11 depicts a large original packet that has been broken up into two fragments (fragment 1 and fragment 2) and encapsulated into two different ERSPAN encapsulated packets 1160 in which the header portion of the original packet (e.g., ETH, IP, TCP/UDP) is uncompressed and the payload portion of the original packet is compressed at the network appliance. In the example of FIG. 11, UDP or TCP may be used at the transport layer (e.g., Layer 4). In such an embodiment, the outer header (e.g., ETH 1162, IP 1164, GRE 1166, and ERSPAN 1168) of each ERSPAN encapsulated packet 1160 would be the same in the context of a given flow, and the packet header of the original packet (now fragmented) may be maintained in uncompressed form for only the first fragment, but in compressed form for each subsequent fragment as indicated in FIG. 11.

Figure 12:
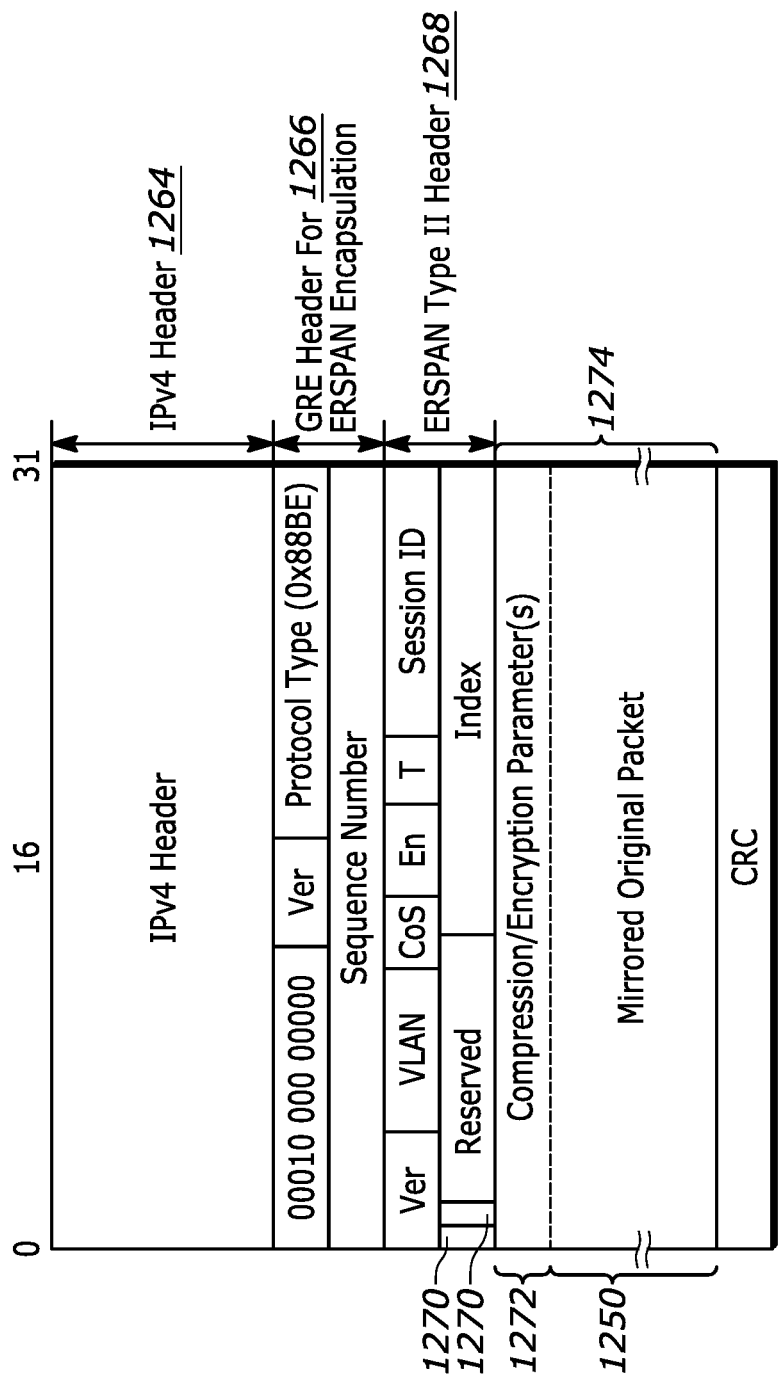
FIG. 12 depicts an example of an ERSPAN encapsulated packet in which two bits of the reserved field are used as compression and encryption indicators.

In some embodiments, it may be desirable to indicate to the Collector whether or not the mirrored network traffic has been compressed and/or encrypted. For example, a field in the header of an ERSPAN packet can be used to indicate the presence/absence of compressed data in the payload and/or a field in the header of the ERSPAN packet can be used to indicate the presence/absence of encrypted data in the payload. For example, one of the 12 reserved bits in the ERSPAN Type II header can be used to indicate the presence/absence of compressed data (e.g., 0=uncompressed, 1=compressed), and one of the 12 reserved bits in the ERSPAN type II header can be used to indicate the presence/absence of encrypted data (e.g., 0=unencrypted, 1=encrypted). Similarly, bits in the header may be used to indicate other information about compression/encryption such as whether the entire original packet is compressed/encrypted or whether only a portion of the original packet (e.g., the payload) is compressed/encrypted. FIG. 12 depicts an example of the header of an ERSPAN encapsulated packet (e.g., IP header 1264, GRE header 1266, and ERSPAN header 1268) in which two bits 1270 of the reserved field of the ERSPAN header are used as compression and encryption indicators. For example, the bits are used to indicate the state of the original packet as follows: reserved bit 0 (0=uncompressed, 1=compressed); reserved bit 1 (0=unencrypted, 1=encrypted). Encoding the ERSPAN header with information about compression/encryption enables the NIC to make decisions (e.g., select between available options) with regard to enhancing mirrored network traffic on the fly (e.g., in real-time), and/or on per-flow and/or per-packet basis.

In another embodiment, bits in the ERSPAN header 1268 may be used to convey parameters related to compression/encryption to the Collector. For example, bits in the reserved field may be used to convey information regarding a decompression and/or decryption parameter to use for decompression/decryption. In an embodiment a bit or bits may be used as an indicator of a particular parameter. In other embodiments, parameters related to compression/encryption may be included in the ERSPAN encapsulated packets for use by the Collector. For example, decompression/decryption parameters (e.g., a decompression key or a decryption key) may be included in the payload of an ERSPAN encapsulated packet. FIG. 12 also depicts an example of the ERSPAN encapsulated packet in which a decompression/decryption parameter, or parameters, 1272 is included in the payload portion 1274 of the encapsulated packet, for example, before the mirrored original packet 1250. Again, encoding an ERSPAN encapsulated packet with information about compression/encryption enables the NIC to make decisions (e.g., select between available options) with regard to enhancing mirrored network traffic on the fly (e.g., in real-time), and/or on per-flow and/or per-packet basis without prior communications with the Collector.

Figure 13:
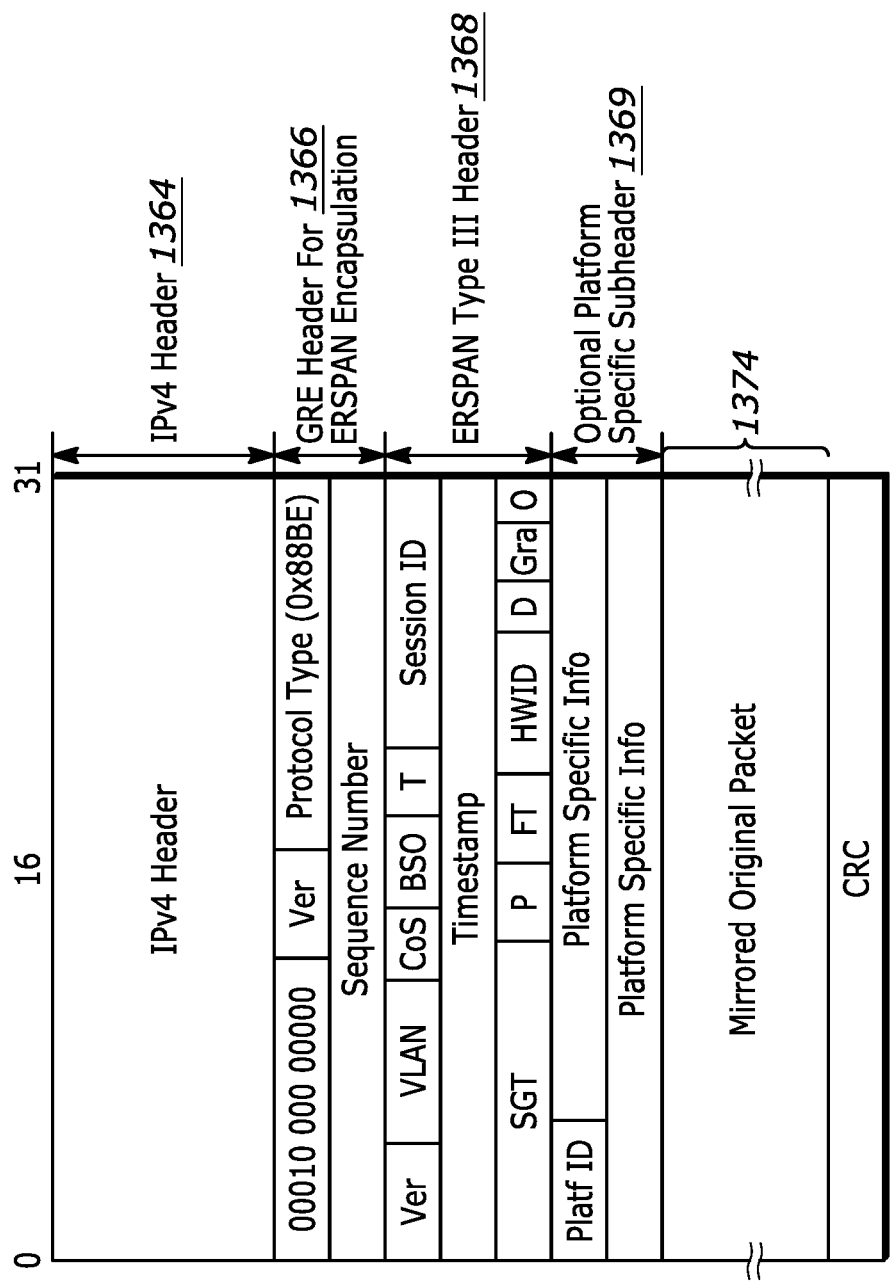
FIG. 13 depicts an example of an ERSPAN encapsulated packet in which a platform specific subheader is used to convey information.

In another embodiment, the mirrored original packets may be encapsulated according to ERSPAN Type III. FIG. 13 depicts an example of an ERSPAN encapsulated packet (e.g., IP header 1364, GRE header 1366, ERSPAN Type III header 1368, optional platform specific subheader 1369, and payload 1374) in which the platform specific subheader is used to convey information related to, for example, compression and encryption as described with reference to FIG. 12. In addition to the examples of FIG. 12 and FIG. 13, in other embodiments, the encapsulation (e.g., ERSPAN encapsulation) can be further modified and/or extended to convey information that can be used to implement value added services related to traffic mirroring.

In an embodiment, the network as shown in FIG. 1 may include multiple different Collectors to which mirrored network traffic can be sent. Additionally, the multiple Collectors may have different capabilities with respect to, for example, compression/decompression and encryption/decryption. In an embodiment, a Collector may include a network appliance (e.g., a NIC) as described above. A Collector equipped with such a NIC can facilitate communication between the NIC at the Host and the NIC at the Collector. For example, the NIC at the host and the NIC at the Collector can communicate compression/decompression and encryption/decryption capabilities amongst each other. Additionally, embedded encoding such as described with reference to FIG. 12 can be decoded at the NIC of the Collector.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods described herein may be implemented using software instructions stored on a computer useable storage medium for execution by a computer. As an example, an embodiment of a computer program product includes a computer useable storage medium to store a computer readable program.

The computer-useable or computer-readable storage medium can be an electronic, magnetic, optical, electromagnetic, infrared, or semiconductor system (or apparatus or device). Examples of non-transitory computer-useable and computer-readable storage media include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for implementing traffic mirroring for network telemetry, the method comprising:
   identifying network traffic at a network appliance that is to be subjected to traffic mirroring for network telemetry; and
   selecting from available options of:
      transmitting enhanced mirrored network traffic from the network appliance to a collector, wherein the enhanced mirrored network traffic is generated at the network appliance by at least one of compressing and encrypting the network traffic; and
      transmitting mirrored network traffic from the network appliance to the collector without compressing or encrypting the network traffic;
   wherein the enhanced mirrored network traffic is generated to include a header field that indicates whether mirrored network traffic is compressed;
   wherein the header field is in a reserved field of an Encapsulated Remote Switch Port Analyzer (ERSPAN) header.

2. The method of claim 1, wherein the enhanced mirrored network traffic is transmitted as ERSPAN encapsulated packets.

3. The method of claim 1, wherein selecting from available options involves selecting from available options in response to an availability of a compression engine of the network appliance.

4. The method of claim 1, wherein selecting from the available options involves selecting from the available options in response to an availability of an encryption engine of the network appliance.

5. The method of claim 1, wherein selecting from the available options involves selecting from the available options in response to a bandwidth on a link connected to the network appliance.

6. The method of claim 1, wherein selecting from the available options involves selecting from the available options in response to a bandwidth on a link that connects the network appliance and the collector.

7. The method of claim 1, wherein selecting from the available options involves selecting from the available options in response to a security parameter.

8. The method of claim 1, wherein selecting from the available options involves the network appliance learning a capability of the collector and selecting from the available options based on the capability of the collector that is learned by the network appliance.

9. The method of claim 1, wherein selecting from the available options involves selecting from the available options based at least on part on whether or not the collector can decompress network traffic.

10. The method of claim 1, wherein selecting from the available options involves selecting from the available options based at least on part on whether or not the collector can decrypt network traffic.

11. The method of claim 1, wherein the enhanced mirrored network traffic is generated at the network appliance by compressing an entire payload of a telemetry packet.

12. The method of claim 1, wherein the enhanced mirrored network traffic includes a decompression parameter embedded in a payload portion of an ERSPAN encapsulated packet.

13. The method of claim 1, wherein the enhanced mirrored network traffic is generated to include a header field that indicates whether mirrored network traffic is encrypted.

14. The method of claim 13, wherein the header field is in a reserved field or in a platform specific subheader of a ERSPAN header.

15. The method of claim 13, wherein the enhanced mirrored network traffic includes a decryption parameter embedded in a payload portion an ERSPAN encapsulated packet.

16. The method of claim 1, wherein the enhanced mirrored network traffic includes multiple compressed original mirrored packets in a single telemetry packet.

17. The method of claim 1, wherein the enhanced mirrored network traffic includes multiple compressed original mirrored packets in a single ERSPAN encapsulated packet.

18. The method of claim 1, wherein the enhanced mirrored network traffic includes multiple telemetry packets that carry portions of the same original mirrored packet.

19. A non-transitory computer readable medium that stored computer readable instructions, which when executed by one or more processors implements a method for implementing traffic mirroring for network telemetry, the method comprising:
identifying network traffic at a network appliance that is to be subjected to traffic mirroring for network telemetry; and
selecting from available options of:
transmitting enhanced mirrored network traffic from the network appliance to a collector, wherein the enhanced mirrored network traffic is generated at the network appliance by at least one of compressing and encrypting the network traffic; and
transmitting mirrored network traffic from the network appliance to the collector without compressing or encrypting the network traffic;
wherein the enhanced mirrored network traffic is generated to include a header field that indicates whether mirrored network traffic is compressed;
wherein the header field is in a reserved field of an Encapsulated Remote Switch Port Analyzer (ERSPAN) header.

20. A network appliance comprising:
a network interface;
a PCIe interface;
memory; and
a processor configured to: identify network traffic at a network appliance that is to be subjected to traffic mirroring for network telemetry; and
select from available options of:
generating enhanced mirrored network traffic by at least one of compressing and encrypting the network traffic at the network appliance, and transmitting the enhanced mirrored network traffic from the network appliance to a collector; and
transmitting mirrored network traffic from the network appliance to the collector without compressing or encrypting the network traffic;
wherein the enhanced mirrored network traffic is generated to include a header field that indicates whether mirrored network traffic is compressed;
wherein the header field is in a reserved field of an Encapsulated Remote Switch Port Analyzer (ERSPAN) header.

21. The network appliance of claim 20, wherein the enhanced mirrored network traffic is transmitted as ERSPAN encapsulated packets.

* * * * *